United States Patent [19]

Takada

[11] 4,422,593

[45] Dec. 27, 1983

[54] BELT CLAMPS FOR VEHICLE OCCUPANT RESTRAINT BELT SYSTEMS

[76] Inventor: Juichiro Takada, 3-12-1 Shinmachi, Setagayaku, Tokyo, Japan

[21] Appl. No.: 381,645

[22] Filed: May 24, 1982

[30] Foreign Application Priority Data

May 29, 1981 [JP] Japan .............................. 56-081116

[51] Int. Cl.³ ...................... A62B 35/02; B65H 75/48; B65H 59/00
[52] U.S. Cl. ................................ 242/107.2; 188/65.1; 280/806; 297/479
[58] Field of Search .......................... 188/65.1, 65.4; 242/107.2; 280/806, 808; 297/478, 479, 480; 24/DIG. 22

[56] References Cited

U.S. PATENT DOCUMENTS

| Re. 30,707 | 8/1981 | Adomeit | 242/107.2 |
| 4,211,377 | 7/1980 | Yasumatsu | 242/107.2 |

FOREIGN PATENT DOCUMENTS 2064943  6/1981  United Kingdom ................ 280/808

Primary Examiner—Stuart S. Levy
Assistant Examiner—Lloyd D. Doigan
Attorney, Agent, or Firm—Brumbaugh, Graves, Donohue & Raymond

[57] ABSTRACT

A belt clamp for vehicle safety belt systems comprises a fixed clamping jaw mounted on a frame and a movable clamping jaw engaged by the belt and carried by the frame in a manner such that it moves toward the fixed clamping jaw in response to tension in the belt. Spacers on the frame limit the extent of movement of the movable clamping jaw toward the fixed clamping jaw. A deformable member interposed between the fixed clamping jaw and the frame deforms in response to a predetermined tensile load on the belt so that the belt is allowed to slip through the clamping jaws and absorb the kinetic energy of the occupant.

10 Claims, 10 Drawing Figures

BELT CLAMPS FOR VEHICLE OCCUPANT RESTRAINT BELT SYSTEMS

FIELD OF THE INVENTION

The present invention relates to belt clamps for vehicle safety belt systems and, in particular, to a belt clamp in which a segment of a belt included in the system is clamped and kept from moving between a fixed clamping jaw and a movable clamping jaw as long as the tensile force in the belt is below a predetermined level but is allowed to slip through the jaws when the tensile force exceeds the predetermined level to absorb the kinetic energy of an occupant who is thrust forward against the belt system.

BACKGROUND OF THE INVENTION

During the past few years the vehicle occupant safety belt systems with which most vehicles have been equipped have employed emergency locking retractors. One of the problems with emergency locking retractors is that they permit a significant amount of elongation of the effective length of the belt in a collision due to the tightening of the several turns of the belt on the belt reel. Those turns or loops of the belt that remain on the reel when it is fastened up are comparatively loose, and the very high forces imposed on the belt in a collision are sufficient to tighten them considerably, thereby allowing a length of the belt to withdraw from the belt reel even though the reel is locked against rotation by the emergency locking mechanism.

There have been various proposals for providing some sort of clamp in association with an emergency locking retractor to reduce or eliminate the release of a length of the belt from the reel due to tightening of the remaining loops. Many of the proposals made in the past have been unsatisfactory either because they never fully lock the belt but let it slip or they present a possibility of failure of the belt upon imposition of a very high pull-out force. There have also been belt clamps which seem adequate to withstand the pull-out force reasonably well without belt failure, but they have been difficult to release, an inconvenience for the occupant who has to release the belt by hand each time the device is activated.

The inventor of the present invention has heretofore invented a belt clamp that follows the general principles of many conventional belt clamps but overcomes their possible problems and fully locks the belt in an effective and relatively simple way. In particular, that belt clamp comprises a movable clamping jaw, a fixed clamping jaw and a movable turning roll having a corrugated surface around which the belt wraps in almost a full U-turn. Upon imposition of a pull-out force on the belt above a selected level, the turning roll engages the movable clamping jaw and moves it toward the fixed clamping jaw, thereby to clamp the belt between the jaws. In order to keep the turning roll from cocking when the belt is pulled in an oblique direction (in a direction sideways to the belt length), the turning roll is carried by a U-shaped lever and is supported by a shaft that slides in arcuate guide slots in the frame—hence, the turning roll axis remains parallel to the crosswise profiles of the fixed clamping jaw as it moves in response to the force in the belt and exerts uniform pressure on the belt across its width. Reference may be made to the specification and drawings of the present inventor's U.S. patent application Ser. No. 275,364 filed June 19, 1981, and entitled "Belt Clamps for Vehicle Occupant Restraint Belt Systems" for a full description and illustration of the above-referred to belt clamp.

In many belt clamps heretofore known in the art, the squeezing pressure applied to the belt increases as the tensile load on the belt increases. The squeezing force can reach a level high enough to initiate failure of the belt, particularly in clamps that have sharp teeth or knurled surfaces that bite into the belt to prevent it from slipping. One way to reduce the chance of belt failure is to mount the entire clamp assembly or the belt anchor on a structural element, such as a bracket, that is designed to deform when the belt force becomes high enough to produce failure. Another way is to limit by suitable stops the amount of movement of the movable jaw toward the fixed jaw so the squeezing force on the belt is kept from becoming high enough to present a risk of belt failure. Both of these approaches, however, are difficult to achieve in reliable, inexpensive and simple ways. In the latter case, strict manufacturing tolerances must be maintained to ensure that the gap between the jaws is stopped at just the right size, lest the squeezing force be too low, thus allowing the belt to slip under too low a tensile load, or too high, thus presenting a risk of belt failure.

SUMMARY OF THE INVENTION

There is provided, in accordance with the present invention, an improvement in a belt clamp for vehicle safety belt systems that is useful in belt clamps that include a frame, a fixed clamping jaw mounted on the frame adjacent the path of a belt of the system and a movable clamping jaw that is suitably mounted on the frame such that it is engaged by the belt and is moved in response to tension in the belt toward the fixed clamping jaw such that the belt is clamped between the jaws and prevented from pulling out.

The invention is characterized in that there is at least one stop surface on the frame that is engageable by the movable clamping jaw to limit the extent of its movement toward the fixed clamping jaw and in that there is at least one member interposed between the fixed clamping jaw and the frame that is adapted to deform in response to a predetermined tensile load on the belt and thereby allow the belt to slip through the clamping jaws under such load and absorb the kinetic energy of an occupant who is thrust forward against the belt system. The deformable member may be a body of an elastomeric synthetic resin, for example, a polyester or polyurethane in either solid or cellular form, a body of a natural or synthetic rubber, a soft metal, such as aluminum, an aluminum alloy or lead, or a frangible material, such as a ceramic. Depending upon the material chosen for the deformable member, the member may be deformed elastically or plastically under the stress that is produced in it in response to the predetermined tensile load on the belt at which the belt is permitted to slip. By definition, elastomeric materials deform elastically. Soft metals are designed in such a way that they deform plastically under the stress imposed on them at the predetermined tensile load. Frangible materials are designed to break under the compressive stress at the predetermined tensile load. In addition to wide variations in the choice of materials for the deformable member, the size and shape of the member can also vary, the variations in shape including plates, rods and tubes.

For a better understanding of the invention, reference may be made to the following description of exemplary embodiments, taken in conjunction with the figures of the accompanying drawings.

DESCRIPTION OF THE EMBODIMENTS

Figure 1:
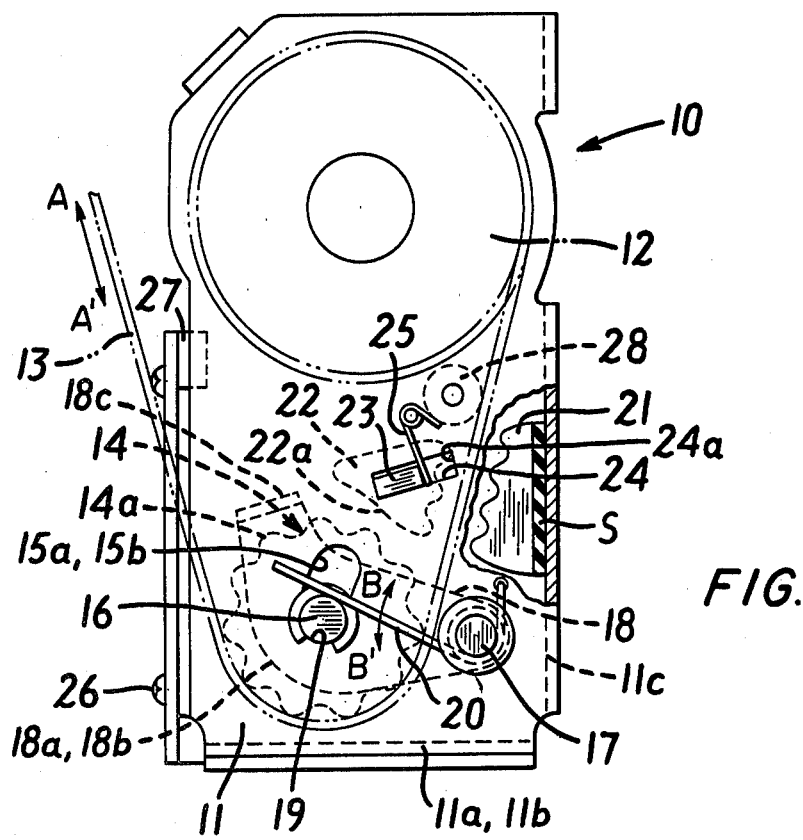
FIG. 1 is a side elevational view of a retractor and belt clamp assembly embodying the present invention, a portion being shown broken away in cross-section.
Figure 2:
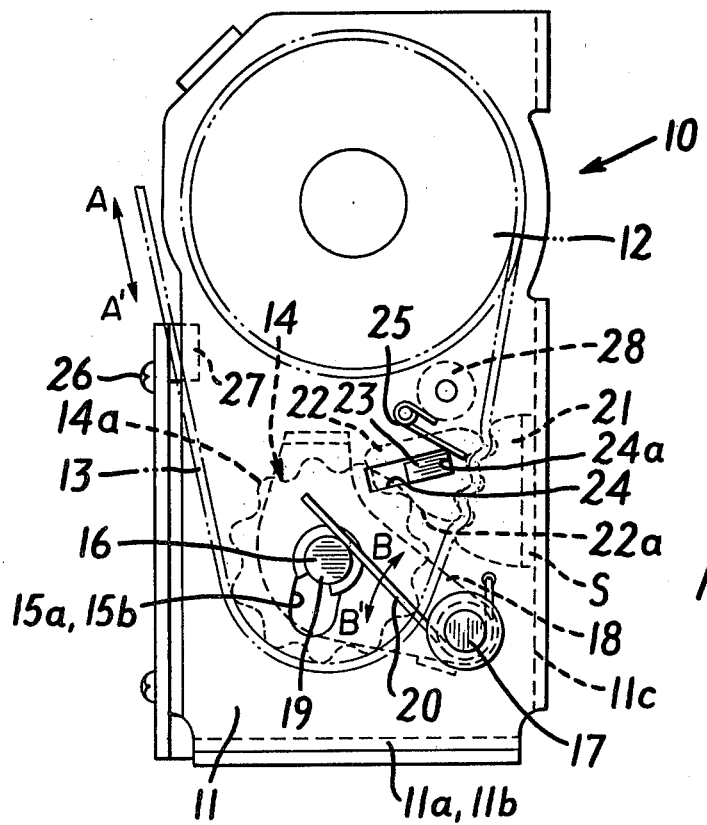
FIG. 2 is a side elevational view of the embodiment shown in FIG. 1.

The belt clamp shown in FIG. 1 is built into an assembly that includes an emergency locking retractor 12, which may be of any suitable design, many of which are presently known and in widespread use and, therefore, are not described or illustrated herein. The present invention may, of course, be applied to a belt clamp that is a separate unit used in association with a separate emergency locking retractor. The present invention is, moreover, applicable to belt clamps of various designs, the form shown in FIGS. 1 and 2 being merely exemplary of designs which utilize a fixed clamping jaw, a movable clamping jaw and some sort of mechanism associated with the belt that moves the movable clamping jaw toward the fixed clamping jaw to grip the belt in response to tension applied to the belt in the pull-out direction.

The belt clamp and retractor assembly 10 shown in the drawings comprises a U-shaped frame 11 having a base 11c and a pair of sides 11a and 11b. The belt 13 leads from the retractor reel over a guide roller 28 and then through the space between a fixed clamping jaw 21 and a movable clamping jaw 22. The fixed clamping jaw 21 is mounted on the frame base 11c in a manner that is shown in detail in other figures of the drawings and is described below. The movable clamping jaw 22 has lugs 23 that extend out from either end and are received in guide slots 24 in the respective sides 11a and 11b of the frame. Springs 25 normally urge the movable clamping jaw 22 into the position shown in FIG. 1 in which the smoothly rounded transverse teeth on the respective clamping jaws are comparatively widely spaced apart so that the belt can move freely in both the unwinding direction A and the winding direction A'.

After passing through the space between the jaws, the belt makes a nearly complete U-turn around a corrugated turning roll 14 so that it leads away from the turning roll in a direction nearly opposite to the direction of approach to the turning roll from the retractor reel. The turning roll 14 includes a shaft 16 that extends out from either end through matching arcuate guide slots 15a and 15b in the side frames 11a and 11b. Springs 20 engage the end portions of the shaft 16 and normally hold the turning roll in the retractor position shown in FIG. 1 against movement in response to moderate forces applied to the belt. The shaft 16 of the turning roll is supported in holes in lever arms 18a and 18b on either side of the turning roll 14. The lever arms are carried by a shaft 17 that pivots in holes in the frame sides, as indicated by the arrow line B—B', and they are rigidly interconnected by the shaft and, preferably, by being portions of a unitary U-shaped lever member 18 having a transverse connecting portion 18c. Smooth guide elements 27 attached by screws 26 to the frame sides keep the belt tracking on the turning roll.

Under relatively low forces on the belt, i.e., the rewinding forces in the direction A' imposed by the retractor 12 and in the direction A imposed when the occupant is pulling out the belt or when the belt is pulled out automatically in the case of a passive seat belt system, the springs 20 restrain the lever 18 and the turning roll 14 from pivoting in the direction B, and the springs 25 keep the movable clamping jaw 22 in the retracted position shown in FIG. 1. (The springs 25 may be omitted, because gravity will usually locate the movable jaw in the retracted position, but it is preferable to have the springs 25 in case the lugs bind in the guide slots.)

In the event of a sudden stop or a collision that activates the locking mechanism of the retractor 12 (which may, depending on the type of retractor, be accomplished by an inertia responsive locking mechanism or a locking mechanism that responds to rapid acceleration of the belt reel in the unwinding direction) the belt will be prevented from unwinding from the belt reel. When the force on the belt reaches a certain level, the force of the springs 20 will be overcome, and the lever 18 will pivot in the clockwise direction B, thereby engaging the corrugated surface 14a of the turning roll with a camming surface 22a on the movable clamping jaw 22. The clamping jaw 22 will be pushed along the guide slots 24 toward the fixed clamping jaw 21 (see FIG. 2), and the belt will be gripped between the corrugated gripping surfaces such that frictional forces in excess of the pullout forces on the belt prevent the belt from moving through the jaws. The greater the pull-out force on the belt, the greater will be the gripping forces of the jaws that resist the pull-out force. When the high force on the belt ceases, the springs 20 will pivot the turning roll in the direction B' back to the retracted position shown in FIG. 1, and the movable clamping jaw will likewise be restored to the release position by the springs 25.

Figures 3A, 3B, 4:
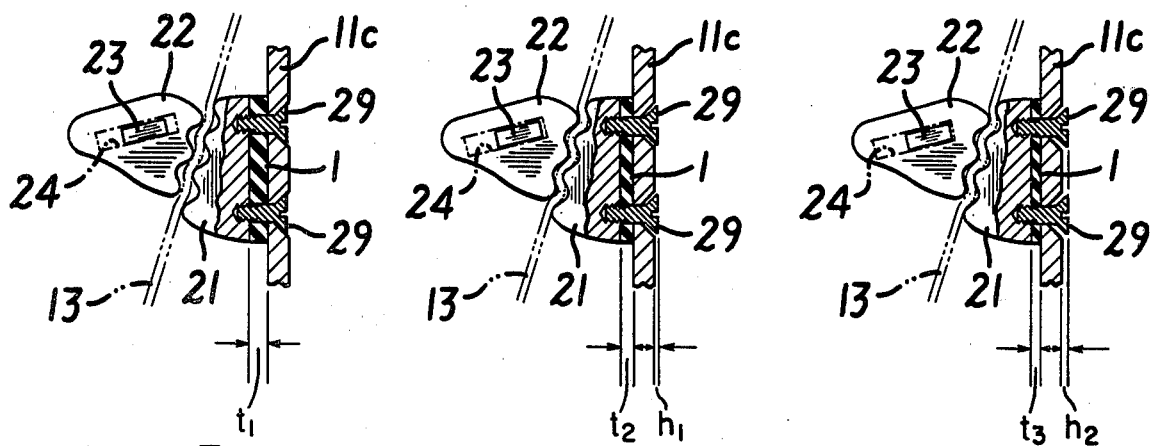
FIG. 3A is a side elevational view of the clamping jaws and one embodiment of deformable member, a portion of the view being broken away in cross-section and the clamping jaws being shown in the positions they assume under a relatively low tensile load on the belt.
FIG. 3B is a view similar to FIG. 3A except that the clamping jaws and deformable member are shown in the positions they assume when the belt is under a high tensile load.
FIG. 4 is a view similar to FIGS. 3A and 3B except that the parts are shown in the positions they occupy when the belt slips.

The embodiment of the invention shown in FIGS. 3A, 3B, and 4 provides for release of the belt from the restraint of the clamping jaws when the pull-out force reaches a predetermined magnitude, for example, 1800 kg. The fixed clamping jaw 21 is fastened to the base 11c of the frame by a number of screws 29 that pass freely through the base into tapped holes. A deformable member 1 (labelled S in FIGS. 1 and 2), in this case a plate of an elastomeric material, is interposed between the fixed clamping jaw 21 and the frame base 11c. The material, size and shape of the deformable member are chosen such that the reaction force exerted by the deformable member when the movable clamping jaw 22 is in the stopped position (FIG. 3B) produces frictional forces on the belt of a magnitude corresponding to the selected tensile load on the belt at which the belt is allowed to slip.

Under a comparatively low load or no load the compressible member has an initial thickness $t_1$ (see FIG. 3A). When the belt load reaches the predetermined point (e.g. 1800 kg.) when it is to slip (see FIG. 3B), the movable clamping jaw 22 reaches a limit position established by engagement of the lugs 23 with the ends 24a of the slots 24, the ends 24a serving as stops. Hence, the movable jaw can move no farther toward the fixed jaw. Meanwhile, the compressible member 1 is compressed to a thickness $t_2$ at which the frictional force balances the pull-out force on the belt. The deformation of the deformable member 1 and the corresponding slight movement of the fixed jaw 21 toward the frame base 11c is permitted by a corresponding displacement $h_1$ of the screws. Any increase in force beyond the magnitude selected for release of the belt by the clamping jaws cannot be resisted by the frictional forces, and there is an additional small deformation of the deformable member due to the clamped part of the belt being pulled toward taut and tending to straighten under the high load and a corresponding displacement of the fixed jaw (see FIG. 4) when the belt 13 actually slips, as indicated by the final thickness $t_3$ and displacement $h_2$ in FIG. 4. The slippage of the belt between the clamping jaws against the residual frictional force imposed on the belt by the clamping jaws absorbs the energy of the occupant during the period of slippage.

Figure 5:
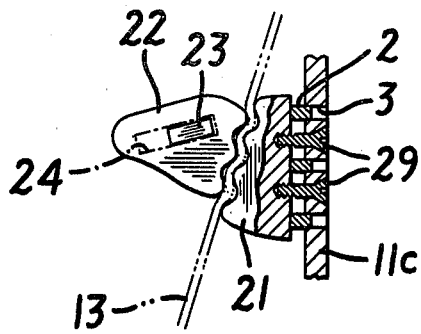
FIG. 5 is a side elevational view of the clamping jaws and another embodiment of deformable member, a portion being broken away in cross-section.

In the embodiment shown in FIG. 5, a number of pins 12 are affixed to the fixed clamping jaw 21 and are press fit into corresponding holes 3 in the frame base 11c. The press fit is such as to develop a predetermined frictional force between the pins 2 and the holes 3, such force being established to sustain the desired maximum frictional force between the belt and the clamping jaws. When the predetermined maximum load on the belt is exceeded, the pins are pushed into the holes to enable displacement of the fixed clamping jaw and allow the belt to slide between the clamping jaws. The pins may be aluminum or an aluminum alloy.

Figure 6:
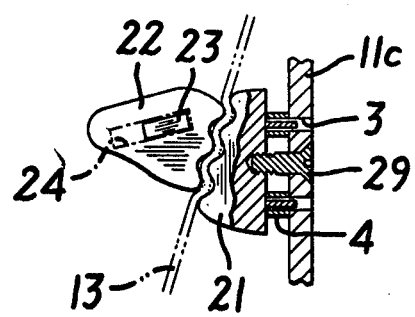
FIG. 6 is an end elevational view, with a portion broken away in cross-section, of another embodiment of the deformable member.

The embodiment of FIG. 6 provides for the desired slippage of the belt by limiting the clamping force on the belt by means of compressible aluminum or aluminum alloy spacer tubes 4 that are kept in place by pins. The spacers are designed to carry a force sufficient to sustain the maximum clamping pressure and corresponding friction on the belt 1 and to deform plastically to allow the belt to slip when the belt load exceeds the maximum friction.

Figure 7:
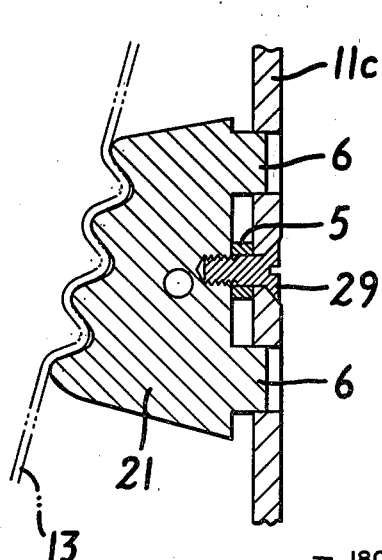
FIG. 7 is a side cross-sectional view of the fixed clamping jaw and still another embodiment of the deformable member.
Figure 8:
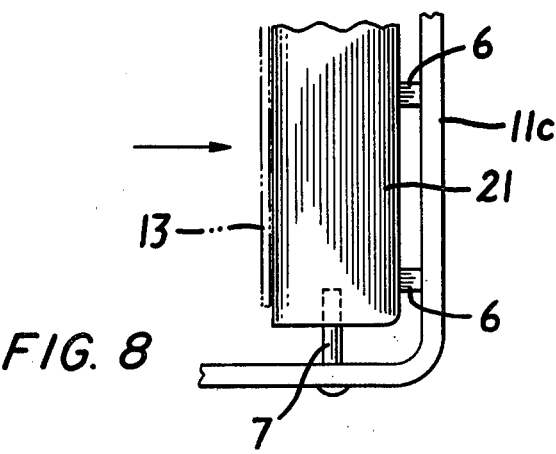
FIG. 8 is a partial top view of the structure shown in FIG. 7.

Referring to FIGS. 7 and 8, the fixed clamping jaw 21 may have positioning lugs 6 that fit into holes in the base 11c and carry loads parallel to the frame base 11c. Compressible spacers 5 are kept in position by screws 29 that hold the jaw 21. In addition to the compressible spacers 5, a rivet 7 extends into a hole 7a at each end of the clamping jaw 21 and assists in sustaining the clamping pressure but releases the fixed jaw 21 by bending or shearing for the necessary slight displacement toward the base 11c to allow the belt to slip.

Instead of providing elements that allow displacement of the fixed jaw toward the frame base by elastic or plastic deformation, the invention may employ breakable deformable members, for example, ceramics, that fail at the desired belt release condition by breaking. It will be understood, therefore, that the present invention contemplates elastic and plastic deformation (by compression or bending) of deformable members as well as deformable members that fracture due to compression or shear. Furthermore, the invention contemplates elastic deformation of metal springs as well as natural and synthetic elastomeric materials.

Figure 9:
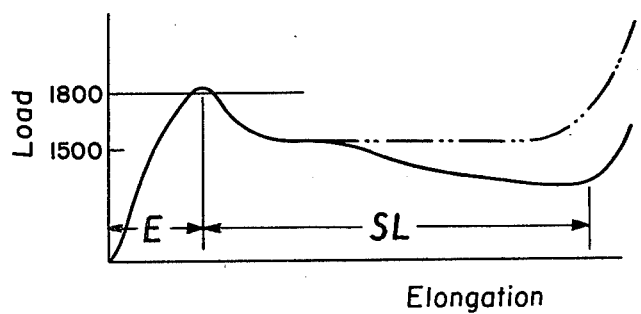
FIG. 9 is a load-elongation diagram for a belt used with a belt clamp embodying the present invention.

FIG. 9 shows the behavior of the belt clamping assembly in terms of the load-elongation curve for the belt 13. As the load in the belt increases from zero, the belt itself elonagates, as exhibited by the part of the curve designated E. When the maximum load, in this example, 1800 k.g., is attained, the clamping jaws allow the belt to slip by a small enlargement of the space between the clamping jaws afforded by deformation of the deformable member. Upon sliding movement of the belt, the static friction that restrained the belt up to the time of release changes to dynamic friction, thereby producing a drop in the load to about 1500 kg as the effective length of the belt increases further in the part of the curve designated SL in FIG. 9. The load then begins to build up once again at the point when the turns of the belt remaining on the retractor reel tighten and the retractor prevents further lengthening of the belt.

In the case of deformable members that deform plastically, the drop in the tensile load in the belt during slippage results not only from the drop in frictional force from static to dynamic but also from the continued yielding of the deformable member as it deforms plastically. This is represented by the solid line in FIG. 9. As shown by the phantom line, elastically deformable members sustain a fairly uniform belt load throughout the period of belt slippage. Some of the kinetic energy of the vehicle occupant restrained by the belt is absorbed by the restrained release of the belt as it slips through the clamp, and the force of the belt on the occupant is kept from becoming undesirably high.

The invention is useful in all types of restraint systems, including both active and passive, in conjunction with lap belts, shoulder belts, and the control belts of three-point systems. In many passive systems, many turns of the belt remain wound on the retractor in the restraint position, so the invention is especially advantageous in passive systems.

I claim:

1. A belt clamp for use in a vehicle safety belt system and having a frame, a fixed clamping jaw mounted on the frame adjacent the path of a belt of the system and a movable clamping jaw carried by the frame and engaged by the belt such that it is adapted to be moved in response to tension in the belt toward the fixed clamping jaw to press a segment of the belt against the fixed jaw and restrain the segment from movement, characterized in that at least one stop surface on the frame is engageable by the movable clamping jaw to limit the extent of its movement toward the fixed clamping jaw and in that there is at least one member interposed between the fixed clamping jaw and the frame that is adapted to deform in response to a predetermined tensile load on the belt and thereby allow the belt to slip through the clamping jaws and absorb the kinetic energy of an occupant who is thrust forward against the belt system.

2. A belt clamp according to claim 1 and further characterized in that the deformable member is a body of a natural or synthetic elastomeric material.

3. A belt clamp according to claim 1 and further characterized in that the deformable member is a body of a solid or cellular synthetic resin.

4. A belt clamp according to claim 1 and further characterized in that the deformable member is a body of a natural or synthetic rubber.

5. A belt clamp according to claim 1 and further characterized in that the deformable member is a body of aluminum or an aluminum alloy.

6. A belt clamp according to claim 1 and further characterized in that the deformable member is a body of a material that is elastic when deformed under a stress that is produced therein in response to said predetermined tensile load on the belt.

7. A belt clamp according to claim 1 and further characterized in that the deformable member is a pin affixed in a hole in the frame.

8. A belt clamp according to claim 1 and further characterized in that the deformable member is a tubular member held in position between the fixed clamping jaw and the frame by a pin affixed to the clamping jaw.

9. A belt clamp according to claim 1 and further characterized in that the deformable member is a spacer member which is plastically deformed at a stress above the yield point of the material thereof generated under a pressure that is produced therein in response to said predetermined load on the belt.

10. A belt clamp according to claim 1 and further characterized in that the deformable member is a body of frangible material which breaks under a stress produced in it in response to said predetermined tensile load.

* * * * *